(12) United States Patent
Badger et al.

(10) Patent No.: US 11,118,573 B2
(45) Date of Patent: Sep. 14, 2021

(54) METHODS AND SYSTEMS FOR REPAIRING WIND TURBINE BLADES

(71) Applicant: Vestas Wind Systems A/S, Aarhus N. (DK)

(72) Inventors: Paul Badger, Salisbury (GB); Servet Sert, Aarhus N (DK)

(73) Assignee: Vestas Wind Systems A/S, Aarhus N. (DK)

( * ) Notice: Subject to any disclaimer, the term of this patent is extended or adjusted under 35 U.S.C. 154(b) by 20 days.

(21) Appl. No.: 16/470,756

(22) PCT Filed: Dec. 12, 2017

(86) PCT No.: PCT/DK2017/050423
§ 371 (c)(1),
(2) Date: Jun. 18, 2019

(87) PCT Pub. No.: WO2018/113875
PCT Pub. Date: Jun. 28, 2018

(65) Prior Publication Data
US 2019/0338759 A1    Nov. 7, 2019

(30) Foreign Application Priority Data

Dec. 20, 2016 (DK) .......................... PA 2016 71004

(51) Int. Cl.
*F03D 80/50* (2016.01)
*B29C 64/106* (2017.01)
(Continued)

(52) U.S. Cl.
CPC ............ *F03D 80/50* (2016.05); *B29C 64/106* (2017.08); *B29C 73/04* (2013.01); *F03D 1/0675* (2013.01); *B64C 2201/123* (2013.01)

(58) Field of Classification Search
CPC ........ F01D 5/286; F03D 1/0675; F03D 80/50; F05B 2230/90; F05B 2260/80;
(Continued)

(56) References Cited

U.S. PATENT DOCUMENTS 8,397,382 B2 * 3/2013 Anasis ................. F03D 1/0675
29/889.1
9,738,381 B1 * 8/2017 Loud .................... G05D 1/0094
(Continued)

FOREIGN PATENT DOCUMENTS

CN          102407004 A     4/2012
CN          103403515 A    11/2013
(Continued)

OTHER PUBLICATIONS

China National Intellectual Property Administration, First Notification of Office Action in CN Application No. 201780083955.X, dated Apr. 7, 2020.
(Continued)

*Primary Examiner* — J. Todd Newton
*Assistant Examiner* — Eric J Zamora Alvarez
(74) *Attorney, Agent, or Firm* — Wood Herron & Evans LLP

(57) ABSTRACT

A method of repairing erosion on a wind turbine blade while on a wind turbine includes placing a scanning device on an erosion zone. The device scans the erosion zone to gather an image and/or digital data. A printing system deposits a material according to the image and/or digital data. The repair system may include a frame such that scanning and/or depositing are with respect to the frame. A processing system interprets the image and/or digital data and produces an instruction file. Depositing the material may include depositing the material according to the instruction file. An unmanned aerial vehicle may be operated to position at least
(Continued)

one of the scanning device and the printing system on the wind turbine blade. Alternatively, a rope/wire system may be operated to lower at least one of the scanning device and the printing system along the wind turbine blade.

8 Claims, 5 Drawing Sheets

(51) Int. Cl.
*B29C 73/04* (2006.01)
*F03D 1/06* (2006.01)

(58) Field of Classification Search
CPC ....... F05B 2270/8041; B64C 2201/027; B64C 2201/12; B64C 2201/18; B64C 2201/108; B64C 2201/123; B64C 2201/127; B64C 39/024; B29C 64/106; B29C 73/04; B64F 5/60; B23P 6/002; B33Y 50/00; B33Y 50/02; G05D 1/0094; G05D 1/0011; G05B 2219/32228
See application file for complete search history.

(56) References Cited

U.S. PATENT DOCUMENTS

| | | | |
|---|---|---|---|
| 2010/0132137 | A1 | 6/2010 | Eggleston |
| 2011/0206534 | A1 | 8/2011 | Riahi |
| 2012/0076345 | A1 | 3/2012 | Fritz et al. |
| 2013/0294923 | A1 | 11/2013 | Takeuchi et al. |
| 2015/0267688 | A1 | 9/2015 | Krampe |
| 2016/0159011 | A1 | 6/2016 | Marchione et al. |
| 2017/0113799 | A1* | 4/2017 | Kovac ................. F03D 80/50 |

FOREIGN PATENT DOCUMENTS

| | | |
|---|---|---|
| CN | 105283303 A | 1/2016 |
| DE | 10330426 A1 | 1/2004 |
| EP | 2559891 A2 | 2/2013 |
| EP | 2615304 A1 | 7/2013 |
| EP | 2623773 A2 | 8/2013 |
| EP | 2674613 A2 | 12/2013 |
| EP | 2700811 A1 | 2/2014 |
| EP | 2818701 A1 | 12/2014 |
| EP | 2927482 A1 | 10/2015 |
| ES | 2461390 A1 | 5/2014 |
| GB | 2525900 A | 11/2015 |
| WO | 2006085054 A1 | 8/2006 |
| WO | 2008157013 A1 | 12/2008 |
| WO | 2010133539 A1 | 11/2010 |
| WO | 2012031168 A1 | 3/2012 |
| WO | 2012123034 A1 | 9/2012 |
| WO | 2013092211 A1 | 6/2013 |
| WO | 2013113815 A1 | 8/2013 |
| WO | 2015015202 A1 | 2/2015 |
| WO | 2015028250 A1 | 3/2015 |
| WO | 2015171349 A1 | 11/2015 |

OTHER PUBLICATIONS

European Patent Office, International Search Report and Written Opinion in PCT Application No. PCT/DK2017/050423, dated Mar. 13, 2018.
Danish Patent and Trademark Office, Search and Examination Report in PA 2016 71004, dated May 10, 2017.
Christina M. Fuges, Rebuild, Don't Replace, Additive Manufacturing, Article, Aug. 18, 2014, 6 pgs.
U.S. Department of Energy, Chapter 6: Innovating Clean Energy Technologies in Advanced Manufacturing, Quadrennial Technology Review 2015, 35 pgs.
Sandip P. Harimkar et al., Additive Manufacturing for Surface Engineering of Materials, Materials Science & Technology 2016, 3 pgs.
European Patent Office, Examination Report in EP Application No. 178716422.4, dated Feb. 4, 2021.
China National Intellectual Property Administration, 2nd Notification of Office Action in CN Application No. 201780083955.X, dated Mar. 5, 2021.

\* cited by examiner

METHODS AND SYSTEMS FOR REPAIRING WIND TURBINE BLADES

TECHNICAL FIELD

The present invention relates generally to wind turbines, and more particularly to wind turbine blades for use on wind turbines and methods and systems for repairing wind turbine blades.

BACKGROUND

Wind turbines are used to produce electrical energy using a renewable resource and without combusting a fossil fuel. Generally, a wind turbine converts kinetic energy into mechanical energy and then subsequently converts the mechanical energy into electrical energy. A horizontal-axis wind turbine includes a tower, a nacelle located at the apex of the tower, and a rotor that is supported in the nacelle. The rotor is coupled either directly or indirectly with a generator, which is housed inside the nacelle. The rotor includes a central hub and a plurality of blades (e.g., three blades) mounted thereto and that extend radially therefrom.

A wind turbine blade is a complex structure that must be constructed to withstand long term service in an abusive environment. To that end, wind turbine blades must satisfy several design criteria. To produce electrical energy, the blade must have a shape that interacts with wind to produce lift while minimizing drag. Lift allows the blade to rotate the hub when acted upon by the wind. The blade must also support itself under gravity, under wind loading, and under other dynamic loading as the wind turbine blade rotates the hub.

In view of these criteria, wind turbine blades are complex structures. Wind turbine blades are often constructed of a shell, spar caps, and one or more shear webs. The shell is typically a layered composite that forms the exterior surface of the blade and encloses the shear webs and spar caps, which enables the shell to resist flap and edgewise loading during use of the blade. The shell is therefore exposed to the environment and is shaped to produce the lift needed to rotate the hub. The surface of the shell needs to resist degradation for as long as possible when exposed to abrasive wear, to UV radiation, and to other harsh environmental conditions.

Even though designed to resist the environment, the shell may eventually erode. For example, a leading edge of the shell may be first to erode. Surface degradation at this location may detrimentally affect power production, and in extreme cases, the layered composite may be structurally damaged.

To restore efficient power production, the shell must be repaired. The cost of repairing the surface of the shell can be significant. If improperly repaired, the aerofoil performance may be degraded so that the wind turbine's power production is reduced rather than improved following repair.

Typical repair schemes may include removing the erosion and filling in the eroded area. Removing the erosion may include grinding the erosion from the shell. This removes surface imperfections and prepares the area for reconstruction. However, grinding requires precision. In that regard, care must be taken during removal of the erosion so that the underlying composite structure is not damaged. Grinding into and removing elements of the composite could impair the structural integrity of the blade. New material is then added to or a shield is placed over the prepared area. The addition of replacement material into the prepared area must be precise to avoid distorting the aerodynamic profile of the blade.

Alternatively, the repair scheme may include filling in the erosion and/or adding material over the affected area. This scheme has the disadvantage of changing the aerodynamic profile of the blade through the addition of material on the surface. By changing the aerofoil shape, the blade performance could be negatively affected. Not only are the repair schemes problematic, but gaining access to the eroded area on the shell is difficult due to the location of the blades.

In that regard, to implement the current repair schemes takes a great deal of manpower and significant preparation prior to performing the repair itself. The wind turbine must be idled prior to and during a repair. A crane must then be brought into position, rigging must be arranged, or a maintenance platform must be assembled to reach the affected area on the blade. Once the eroded area is accessible, the eroded area may be repaired. This overall process results in significant power production losses. Due to the cost and difficulties with the current approaches, it is common for wind turbine owners to allow blades to become badly eroded before they consider blade repair. Procrastination may allow erosion to structurally damage the wind turbine blade. Once damaged, repair may not be possible.

Accordingly, there is a need for improved methods and systems for repairing turbine blade erosion.

SUMMARY

To address these and other drawbacks, a method of repairing erosion on a wind turbine blade while on a wind turbine includes placing a scanning device over or adjacent the erosion zone. Once placed, the scanning device scans the erosion zone to capture an image and/or digital data of erosion in the erosion zone. The method further includes placing a printing system over or adjacent the erosion zone and depositing a material in the erosion zone according to the image and/or digital data from the scanning device. The method may eliminate the need to grind away surface imperfections because the material is applied directly to the identified erosion.

In one embodiment, the scanning device and the printing system are each components of a repair system having a frame such that placing the scanning device and the printing system includes placing the repair system over or adjacent the erosion zone on the wind turbine blade. This configuration provides a reference frame for each of the scanning device and the printing system.

In one embodiment, the method includes translating a detector or a sensor over or adjacent the erosion zone. Scanning may be relative to the reference frame.

In one embodiment, the printing system includes a nozzle and depositing the material includes translating the nozzle over or adjacent the erosion zone and dispensing material from the nozzle. Depositing may be relative to the reference frame.

In one embodiment, the method further includes transmitting the image and/or digital data of the erosion zone to a processing system. The processing system may then interpret the image and/or digital data and produce an instruction file for use by the printing system.

In one embodiment, after scanning, the method further includes providing an additive manufacturing instruction file that corresponds to the image and/or digital data of the erosion zone. Depositing the material may then include depositing the material according to the additive manufacturing instruction file.

In one embodiment, the method includes operating an unmanned aerial vehicle to position at least one of the scanning device and the printing system on the wind turbine blade when the wind turbine blade is parked in a horizontal orientation. Thus, construction of scaffolding or use of a crane is avoided.

In one embodiment, the method includes operating a rope/wire system to lower at least one of the scanning devices and the printing system along the wind turbine blade when the wind turbine blade is parked in a non-horizontal orientation.

In one aspect of the invention, a repair system is capable of repairing a wind turbine blade mounted on a wind turbine and includes a scanning device that is configured to gather an image and/or digital data related to an erosion zone in the wind turbine blade, and a printing system that is configured to deposit a material in the erosion zone according to the image and/or digital data. At least a portion of each of the scanning device and the printing system are capable of translating or moving relative to the erosion zone. In one embodiment, the printing system is an additive manufacturing system.

In one embodiment, the repair system includes a frame and each of the scanning device and the printing system are mounted on the frame. The frame provides a reference plane for movement of each of the scanning device and printing system. In one embodiment, the repair system includes a processing system that is in communication with each of the scanning device and the printing system and is configured to receive the image and/or digital data from the scanning device and to instruct the printing system to translate along the erosion zone and deposit the material into the erosion zone according to the image and/or digital data.

In one embodiment, the repair system further includes a deployment system that is configured to place the repair system over or adjacent the erosion zone. The deployment system may include an unmanned aerial vehicle that is configured to land the repair system on the wind turbine blade and lift the repair system off of a horizontal wind turbine blade. Alternatively, the deployment system may include a rope/wire system that is configured to move the repair system along a non-horizontal wind turbine blade.

BRIEF DESCRIPTION OF THE DRAWINGS

The accompanying drawings, which are incorporated in and constitute a part of this specification, illustrate embodiments of the invention and together with the detailed description given below, serve to explain various aspects of the invention.

DETAILED DESCRIPTION

Figure 1:
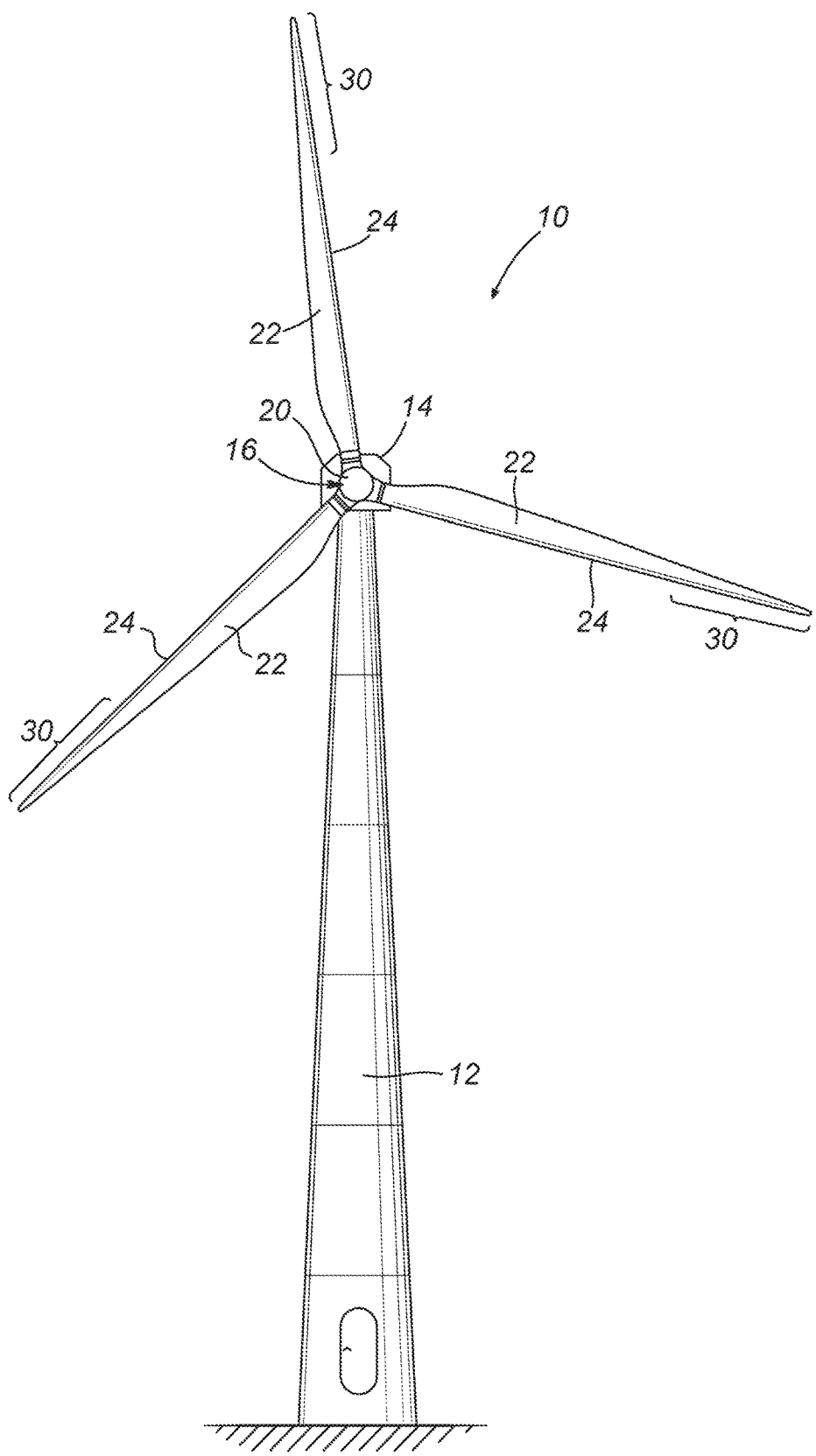
FIG. 1 is a perspective view of a wind turbine according to one embodiment of the invention.

To these and other ends, and with reference to FIG. 1, in an exemplary embodiment of the invention, a wind turbine 10 includes a tower 12, a nacelle 14 disposed at the apex of the tower 12, and a rotor 16 operatively coupled to a generator (not shown) housed inside the nacelle 14. The rotor 16 of the wind turbine 10 includes a central hub 20 and a plurality of wind turbine blades 22 that project outwardly from the central hub 20 at locations circumferentially distributed around the hub 20. As shown, the rotor 16 includes three wind turbine blades 22, but the number of blades may vary from one wind turbine to another. The wind turbine blades 22 are configured to interact with air flow to produce lift that causes the rotor 16 to spin generally within a plane defined by the wind turbine blades 22. As the rotor 16 spins, the wind turbine blades 22 pass through the air with an edge 24 leading the respective wind turbine blade 22 during rotation.

As the wind turbine 10 ages, one or more of the wind turbine blades 22 may experience erosion from prolonged, continuous exposure to the environment. While not being particularly limited to any source, erosion may occur due to particulates in the air that abrade the leading edge 24 of the wind turbine blade 22 during operation. Erosion may occur in an erosion zone 30 that includes the leading edge 24 of one or more of the wind turbine blades 22. Although shown on the leading edge 24, erosion is not necessarily limited to the erosion zone 30 shown in FIG. 1 and may occur along other portions of the wind turbine blades 22.

Figure 1A:
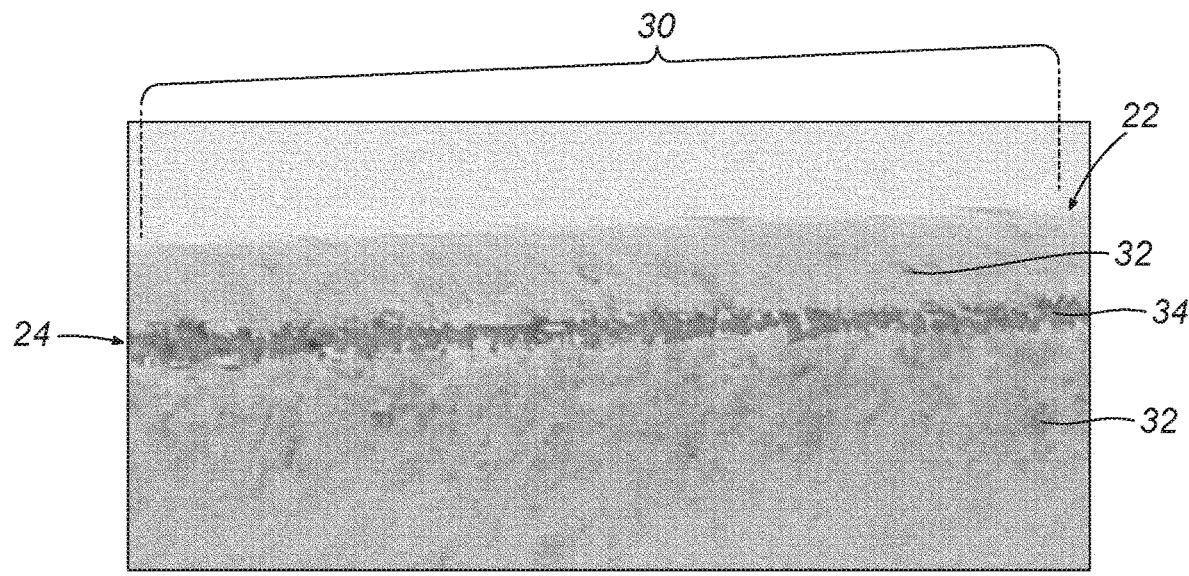
FIG. 1A is a photograph showing an eroded area on a wind turbine blade.
Figure 1B:
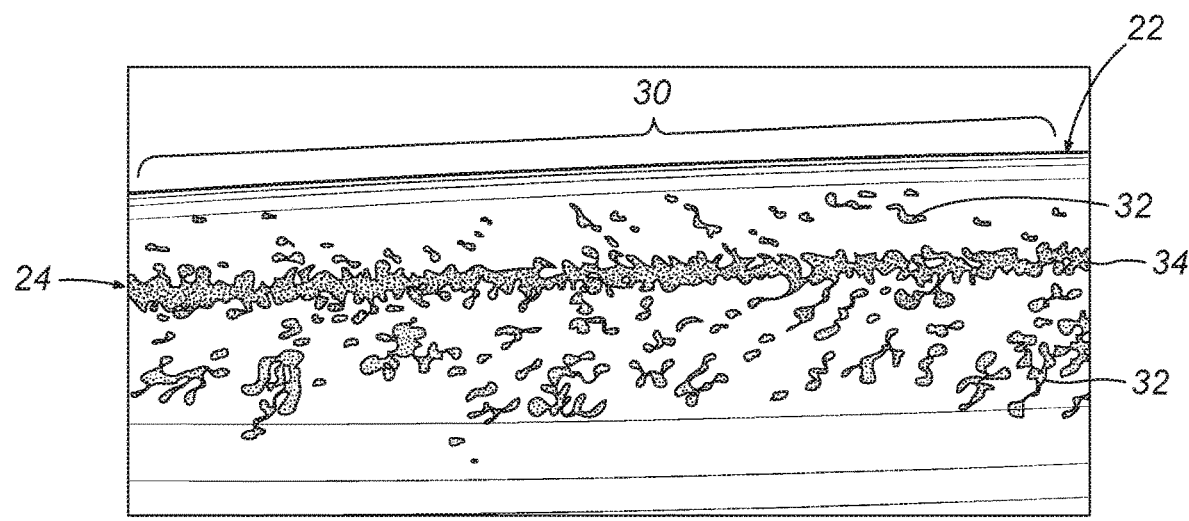
FIG. 1B is a schematic representation of the photograph of FIG. 1A.

With reference to FIGS. 1A and 1B, erosion is generally characterized as a loss of material from the wind turbine blade 22. Material loss may be uniformly distributed but is often non-uniform across the leading edge 24 or any other surface of the wind turbine blade 22. Rather than losing a uniform skin of material from a surface, erosion may include localized surface imperfections, such as random pitting 32 and shallow gouges or crack-like features 34 that may be a result of localized, connected pitting. In any case, if erosion is not repaired, the wind turbine blade 22 becomes less efficient at rotating the rotor 16 and ultimately, the structural integrity of the wind turbine blade 22 may be impaired.

Figure 2:
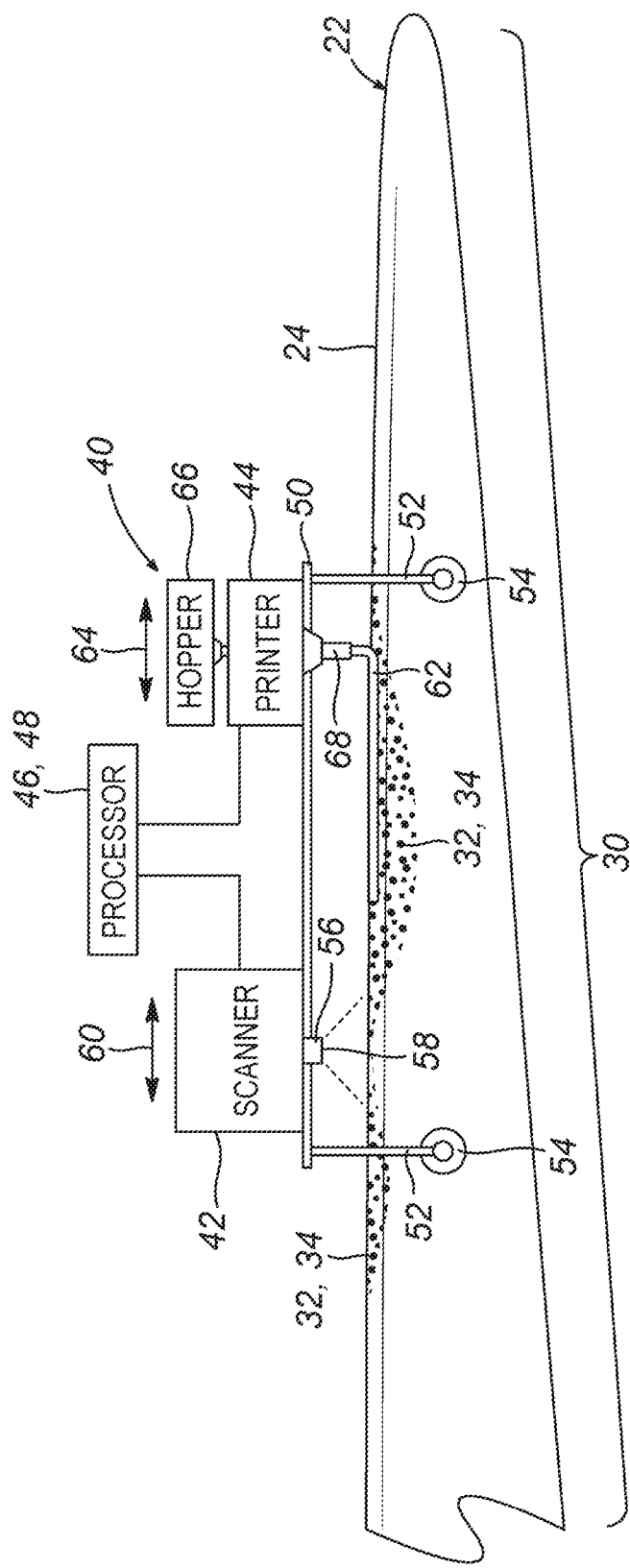
FIG. 2 is an enlarged schematic view of an erosion zone on a wind turbine blade including a repair system according to one embodiment of the invention.

To avoid structural damage and restore the efficiency of the wind turbine blade 22, and with reference to FIG. 2, embodiments of the present invention include a repair system 40 that is selectively placed on the wind turbine blade 22 over or adjacent the erosion zone 30 or a portion of it. The repair system 40 may be capable of precisely identifying the areas of erosion in the wind turbine blade 22 and then repairing the erosion identified.

In that regard, in one embodiment, the repair system 40 includes a scanning device 42 and a deposition system capable of dispensing material onto the blade surface. In the exemplary embodiment, the deposition system is a printing system 44 capable of placing a material onto the erosion zone 30, including into any or all of the pitting 32 and crack-like features 34. Each of the scanning device 42 and the printing system 44 may be in communication with a processing system 46, which may include a processor 48.

The scanning device 42 and the printing system 44 may be mounted on a frame 50 that may include feet 52 by which the repair system 40 may be temporarily placed on the wind turbine blade 22. The frame 50 may be constructed to ensure that the scanning device 42 and the printing system 44 operate in the same coordinate system. The frame 50 may be sufficiently rigid during movement of the scanning device 42 and/or the printing system 44. The frame 50 may not flex at normal operational loads and so provides a reference frame within which each of the scanning device 42 and the printing system 44 operate. In this way, the frame 50 may provide a reference plane to which the scanning device 42 and the printing system 44 are kept in mutual alignment with respect to each other, with respect to the wind turbine blade 22, and also with respect to the erosion zone 30. This characteristic of the frame 50 enables accurate measurement of the leading edge 24 of the wind turbine blade 22 and accurate deposition of material onto the measured area, as is described below.

The processing system 46 may also be mounted to the frame 50 or be remotely located from each of the scanning device 42 and the printing system 44. By way of example only, the processing system 46 may be located on the ground and communicate with each of the scanning device 42 and the printing system 44 via a wireless ground-based communication system (not shown).

One or more devices 54 on the frame 50 (shown, for example, on the feet 52) may be utilized to selectively couple the repair system 40 to the wind turbine blade 22 prior to repair and allow the repair system 40 to be disconnected from the wind turbine blade 22 following repair. By way of example only, and not limitation, depending on the orientation of the wind turbine blade 22 during repair, the devices 54 may include one or more vacuum sucker feet or vacuum cups that may be selectively activated to attach to the surface of the wind turbine blade 22. Advantageously, these nondestructive-types of attachment devices may prevent the wind turbine blade 22 from being damaged at the points of attachment of the repair system 40 to the wind turbine blade 22 while providing a stable, immobile platform from which the scanning device 42 and the printing system 44 may operate.

In general, according to embodiments of the present invention, the repair system 40 may identify areas of erosion, such as pitting 32 and crack-like features 34, and then deposit new material in those identified areas of erosion. Following repair, the repair system 40 may then rescan the repaired area to confirm placement of the new material in the erosion zone 30 and determine the quality of the aerofoil shape along a portion of the leading edge 24. In this way, the repair system 40 identifies erosion on the wind turbine blade 22, repairs the erosion, determines the repair quality, and may measure the aerofoil shape so that a determination may be made about the efficiency of the wind turbine blade 22 following repair.

To one or more of those ends, once the repair system 40 is positioned over the erosion zone 30 and is removably attached to the wind turbine blade 22, a portion of the scanning device 42, such as a detector 56, or the entire scanning device 42, may translate along the frame 50 as is indicated by the arrows 60 in FIG. 2. The detector 56 may include a light source 58, such as a laser or structured/modulated light source capable of illuminating the erosion zone 30 as it is scanned by the detector 56. By translating the detector 56 along the frame 50, image information and/or digital data of the surface of the wind turbine blade 22 may be captured by the detector 56. Alternatively, the scanning device 42 may include a tactile sensor or other sensor capable of gathering image information and/or digital data, such as measurement information, to form a map of the erosion 32, 34 in the erosion zone 30.

The processing system 46 may interpret the information to provide quantitative data regarding one or more types of erosion, such as erosion 32, 34, in the erosion zone 30. By way of example only, the image information and/or digital data may be analyzed by the processing system 46 to form a map of areas of erosion in the erosion zone 30. The digital data regarding erosion 32, 34 may be used to guide the printing system 44. In one embodiment, the processing system 46 may create an additive manufacturing instruction file to be utilized by the printing system 44, described below.

Once erosion 32, 34 is identified and mapped, the processing system 46 may activate the printing system 44 by which the material 62 from a hopper 66 containing powdered material or a reservoir of resin may be dispensed from a nozzle 68 onto the wind turbine blade 22. Alternatively, rather than a hopper 66, a spool (not shown) of material 62 may be extruded through the nozzle 68 into the erosion zone 30.

To cover the erosion zone 30, the printing system 44 may also translate along the frame 50 as is indicated by arrows 64 according to the digital data and/or mapped erosion while dispensing the material 62 from the hopper 66. In one embodiment, the printing system 44 follows instructions from the processing system 46. Accordingly, a path of the dispensed material 62 may exactly match a path generated by the image and/or digital data from the scanning device 42. While translating according to the path, the printing system 44 deposits the material. Thus, the material 62 may be accurately dispensed to fill the erosion 32, 34. Because the repair system 40 may accurately fill in a uniform loss of a skin of material, pitting, and/or cracks in the surface of the leading edge 24, preparing the erosion zone 30 prior to filling, such as by grinding away imperfections, may not be required. Advantageously, embodiments of the invention may eliminate the possibility of damaging an underlying composite structure by grinding too deeply into the wind turbine blade 22. By way of example only, and not limitation, the printing system 44 may be an additive manufacturing system that can accurately and precisely apply material 62 as instructed by the additive manufacturing instruction file produced by the processing system 46.

Figure 4B:
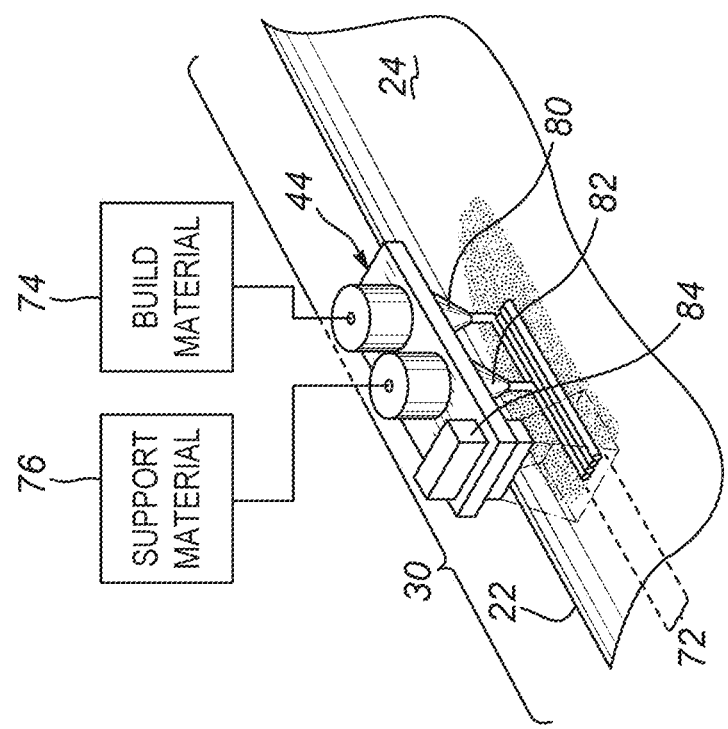
FIGS. 4A and 4B are repair schemes according to embodiments of the invention.
Figure 4A:
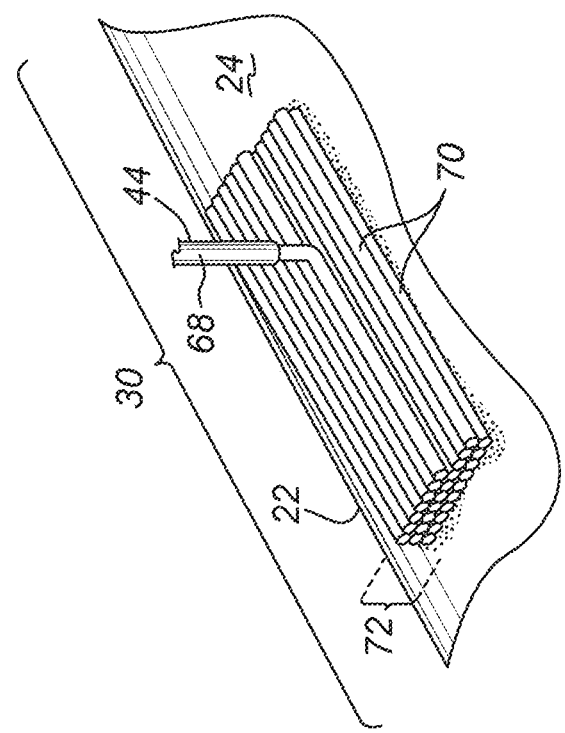

Specific examples of additive manufacturing systems may include 3-D printing shown in FIGS. 4A and 4B. In particular, with reference to FIG. 4A, in one embodiment the printing system 44 may extrude one or more rows 70 into the erosion zone 30. As shown, multiple rows 70 may be stacked side-to-side to fill in an area within the erosion zone 30. Alternatively, or in addition to being stacked side-to-side, the rows 70 may be stacked vertically to form a repair layer 72. The repair layer 72 may ultimately form a new exterior surface of the leading edge 24 of the wind turbine blade 22.

In one embodiment and with reference to FIG. 4B, the printing system 44 may jet a build material 74 with or without a support material 76 from one or more print heads 80, 82 into the erosion zone 30. The printing system 44 may also include a curing lamp 84 that translates with the print heads 80, 82 to cure the build material 74 and the support material 76, if any. The cured build material 74 may form the repair layer 72. The printing system 44 may be capable of depositing many types of materials, for example, thermoplastics, thermosetting resins, and combinations thereof. These materials may be deposited by extrusion techniques, such as fused deposition modeling (FDM) or material jetting and may include an ABS (Acrylonitrile Butadiene Styrene) or PLA (polylactic acid) or similar materials, to name only a few. These processes utilize computer controlled deposition of individual layers of material based on an additive manufacturing instruction file.

Once the material 62 is deposited, for example as the repair layer 72, the repair system 40 may be utilized to check the dimensions of the repair. The scanning device 42 may capture another image or digital information of the repaired area. The repaired area may then be evaluated relative to the original image or original data of the erosion zone 30. It may be possible to determine the shape of the leading edge 24 as defined by the repair layer 72 to assess the power generation efficiency of the repaired turbine blade 22. In this regard, the processing system 46 may analyze the digital data gathered before repair with the digital data gathered after repair. The processing system 46 or an operator may assess the repair quality and any shape data.

Figure 3A:
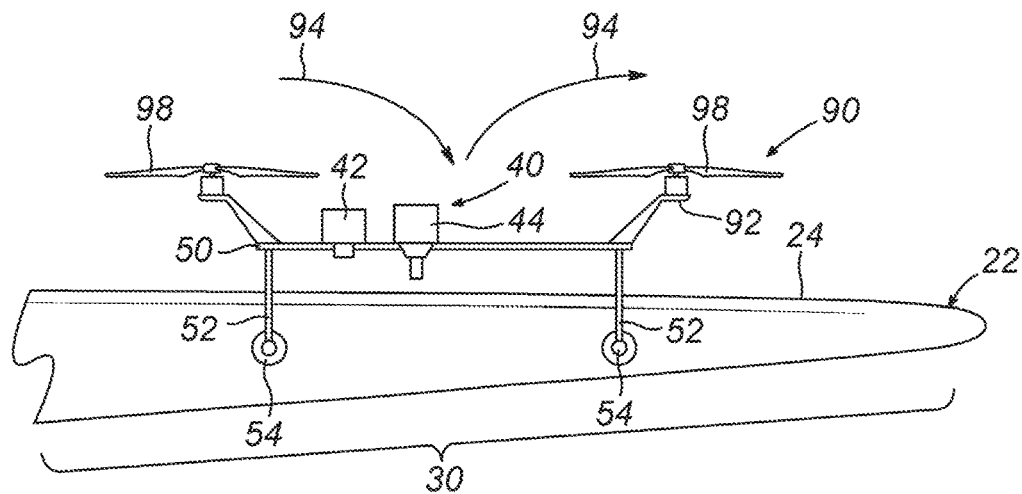
FIGS. 3A and 3B are schematic views of a repair system according to one embodiment of the invention.

With reference now to FIG. 3A, embodiments of the present invention may include a deployment system 90 by which the repair system 40 may be accurately positioned and then moved according to arrows 94 as necessary over the erosion zone 30. With reference to FIG. 3A, in one embodiment the deployment system 90 includes an unmanned aerial vehicle (UAV) 92 including one or more rotor systems 98. Though not limited to any particular location, as shown in FIG. 3A, each rotor system 98 may be secured to the frame 50. The UAV 92 may be remotely operated from the ground near the base of the tower 12 so that the repair system 40 may be positioned on the wind turbine blade 22 without the need for a crane or a scaffold. The UAV 92 may be particularly useful for the wind turbine blade 22 that is parked in a horizontal position as is shown in FIGS. 1 and 3A. The UAV 92 may simply land the repair system 40 on a horizontally disposed leading edge 24 of the wind turbine blade 22. Gravity may hold the repair system 40 in position while the wind turbine blade 22 is repaired. Although shown in FIG. 3A, the device 54 may not be required.

Once a repair is completed, as is described above, the UAV 92 may be utilized to move the repair system 40 to another location on the wind turbine blade 22, to move the repair system 40 onto another wind turbine blade 22 of the wind turbine 10, or to remove the repair system 40 from the wind turbine 10 when repairs are complete. The UAV 92 may also move the repair system 40 to the ground to replenish the hopper 66, to download information from the processing system 46, or for other reasons (e.g., maintenance of the repair system 40). While the deployment system 90 shown in FIG. 3A is integral with the repair system 40, embodiments of the present invention are not limited to an integral deployment system. In that regard, the UAV 92 may be a separate device, such as a drone, that may be utilized to selectively attach to, move, and detach from the repair system 40. The UAV 92 may deliver the repair system 40 to one location. Once repair at that location is complete, the UAV 92 may pick up the repair system 40 and deliver it to another location.

Figure 3B:
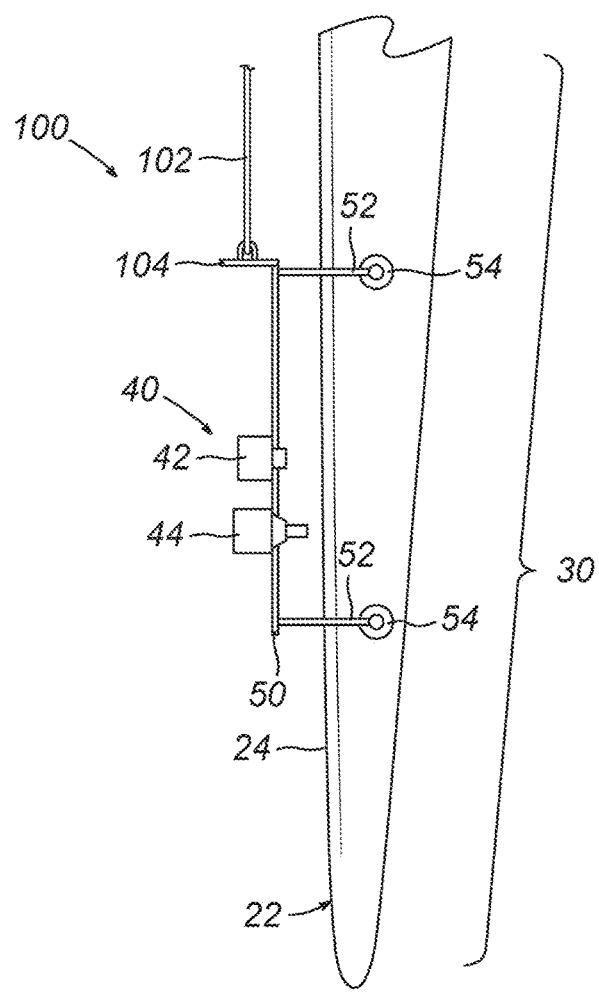

With reference to FIG. 3B, an alternative deployment system 100 may include a rope/wire system 102 that is secured to the repair system 40, for example, by an extension 104 of the frame 50. The repair system 40 may then be lowered down the wind turbine blade 22 to a position adjacent the erosion zone 30. The devices 54 may be activated to releasably secure the repair system 40 to the wind turbine blade 22. As shown, the repair system 40 may be held in an orientation adjacent to the wind turbine blade 22 when it is not horizontal. For example, in FIG. 3B, the wind turbine blade 22 is parked in a vertical orientation. For non-horizontal orientations, the deployment system 100 may allow the repair system 40 to be selectively moved along the leading edge 24 of the wind turbine blade 22 under the influence of gravity. While not shown, other deployment systems may include a robotic system that crawls or rolls along or down the wind turbine blade 22.

While the present invention has been illustrated by a description of various embodiments and while these embodiments have been described in some detail, it is not the intention of the inventor to restrict or in any way limit the scope of the appended claims to such detail. Thus, additional advantages and modifications will readily appear to those of ordinary skill in the art. The various features of the invention may be used alone or in any combination depending on the needs and preferences of the user.

What is claimed is:

1. A repair system for repairing a wind turbine blade mounted on a wind turbine comprising:
   a frame;
   a scanning device movably mounted to the frame, the scanning device configured to gather an image and/or digital data related to an erosion zone in the wind turbine blade;
   a printing system movably mounted to the frame, the printing system configured to deposit a material in the erosion zone according to the image and/or digital data; and
   a deployment system configured to place the frame over or adjacent the erosion zone, wherein the deployment system includes an unmanned aerial vehicle that is configured to land the frame on the wind turbine blade in a horizontal orientation thereof, and lift the frame off the wind turbine blade,
   wherein at least a portion of each of the scanning device and the printing system is capable of translating relative to the erosion zone by moving relative to the frame.

2. The repair system of claim 1, further comprising:
   a processing system that is in communication with each of the scanning device and the printing system and is configured to receive the image and/or digital data and to instruct the printing system to translate along the erosion zone and deposit the material into the erosion zone according to the image and/or digital data.

3. A method of repairing an erosion zone on a wind turbine blade on a wind turbine, the method comprising:
   providing the repair system of claim 1;
   parking the wind turbine blade in a horizontal orientation;
   placing the repair system over or adjacent the erosion zone by operating the unmanned aerial vehicle to position the scanning device and the printing system on the wind turbine blade;
   placing the scanning device over or adjacent the erosion zone;
   scanning the erosion zone by moving at least a portion of the scanning device relative to the frame to capture an image and/or digital data of erosion in the erosion zone; and
   placing the printing system over or adjacent the erosion zone; and
   depositing a material in the erosion zone by moving at least a portion of the printing system relative to the frame according to the image and/or digital data.

4. The method according to claim 3, wherein scanning includes translating a detector or a sensor over or adjacent the erosion zone.

5. The method according to claim 3, wherein the printing system includes a nozzle and wherein depositing the material includes translating the nozzle over or adjacent the erosion zone and dispensing material from the nozzle.

6. The method according to claim 3, further comprising:
   transmitting the image and/or digital data of the erosion zone to a processing system.

7. The method according to claim 3, wherein after scanning, the method further comprises:
   providing an additive manufacturing instruction file that corresponds to the image and/or digital data of the erosion zone.

8. The method according to claim 7, wherein depositing the material includes depositing the material according to the additive manufacturing instruction file.

\* \* \* \* \*